United States Patent [19]

McKim et al.

[11] Patent Number: 4,725,367
[45] Date of Patent: Feb. 16, 1988

[54] BUOYANT FILTER MEDIA

[75] Inventors: Matthew P. McKim, Oakville; Brett D. Kahler, Brampton, both of Canada

[73] Assignee: Ontario Research Foundation, Mississauga, Canada

[21] Appl. No.: 915,690

[22] Filed: Oct. 6, 1986

[30] Foreign Application Priority Data

Oct. 4, 1985 [GB] United Kingdom ............... 8524495

[51] Int. Cl.$^4$ .............................................. B10D 37/00
[52] U.S. Cl. ..................................... 210/793; 210/807;
210/275; 210/286
[58] Field of Search ............... 210/661, 265, 804, 807,
210/320, 297, 305, 306, 792, 793, 794, 795, 538,
540, 714, 617, DIG. 9, 286, 269

[56] References Cited

U.S. PATENT DOCUMENTS

| | | | |
|---|---|---|---|
| 1,398,285 | 11/1921 | Tanner | 210/265 |
| 1,919,567 | 7/1933 | Laughlin et al. | 210/265 |
| 2,227,099 | 12/1940 | Mallory | 210/265 |
| 2,715,964 | 8/1955 | Martin | 210/265 |
| 2,878,935 | 3/1959 | Magrath et al. | 210/265 |
| 3,077,987 | 2/1963 | Morimoto | 210/289 |
| 3,471,025 | 10/1969 | Dobson | 210/282 |
| 3,473,661 | 10/1969 | Duff | 210/265 |
| 4,246,118 | 1/1981 | Tada et al. | 210/275 |
| 4,446,027 | 5/1984 | Simmers | 210/661 |
| 4,547,286 | 10/1985 | Hsiung | 210/792 |
| 4,551,246 | 11/1985 | Coffing | 210/540 |
| 4,555,340 | 11/1985 | Boyle | 210/525 |
| 4,591,437 | 5/1986 | Ernryd et al. | 210/265 |
| 4,608,181 | 8/1986 | Hsiung et al. | 210/795 |

FOREIGN PATENT DOCUMENTS

| | | | |
|---|---|---|---|
| 1036952 | 8/1978 | Canada | 210/265 |
| 0326958 | 3/1919 | Fed. Rep. of Germany | 210/265 |
| 0372913 | 4/1907 | France | 210/265 |

Primary Examiner—Richard V. Fisher
Assistant Examiner—Coreen Y. Lee
Attorney, Agent, or Firm—Sim & McBurney

[57] ABSTRACT

A liquid purification system using buoyant filter media for removing suspended solids from liquid comprising a vessel having a wastewater inlet and a clarified effluent outlet. Baffles are provided in the vessel to define an upflow region for the wastewaters over a weir into a downflow region for subsequent removal by the effluent outlet. Buoyant media is provided in the upflow and downflow regions where the buoyancy of the media in the upflow region carries some of the buoyant media over into the downflow region until equilibrium is reached. A device may be provided for the continuous removal, washing and return of buoyant media to the system.

13 Claims, 6 Drawing Figures

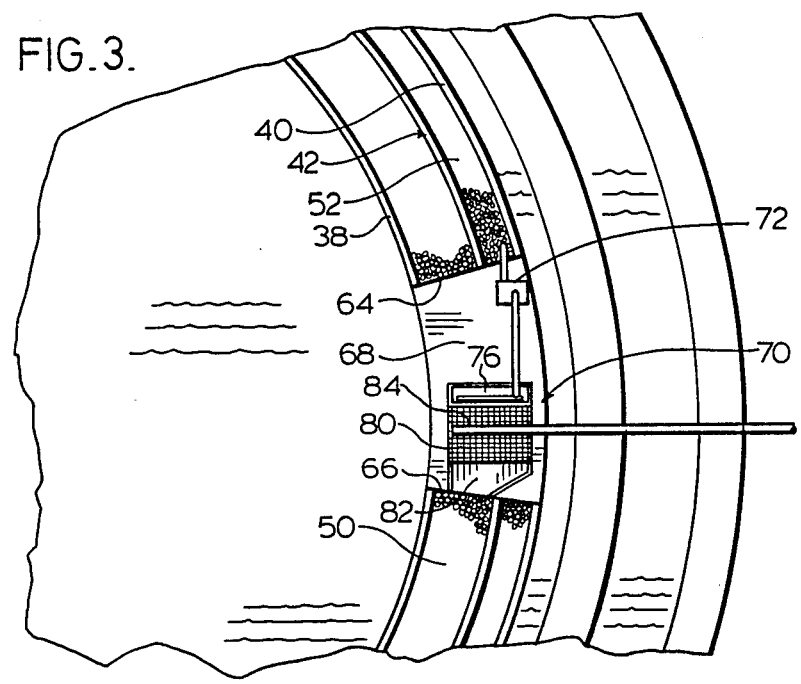
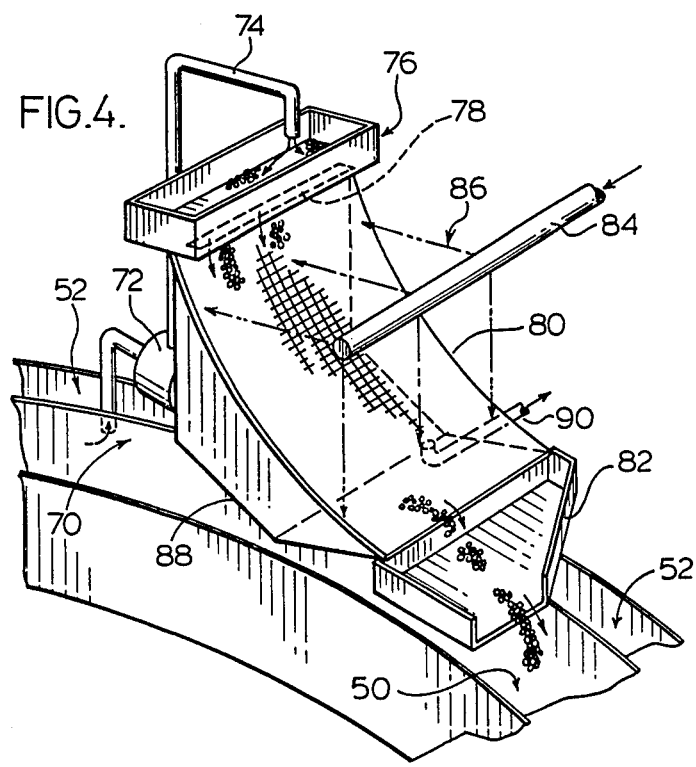

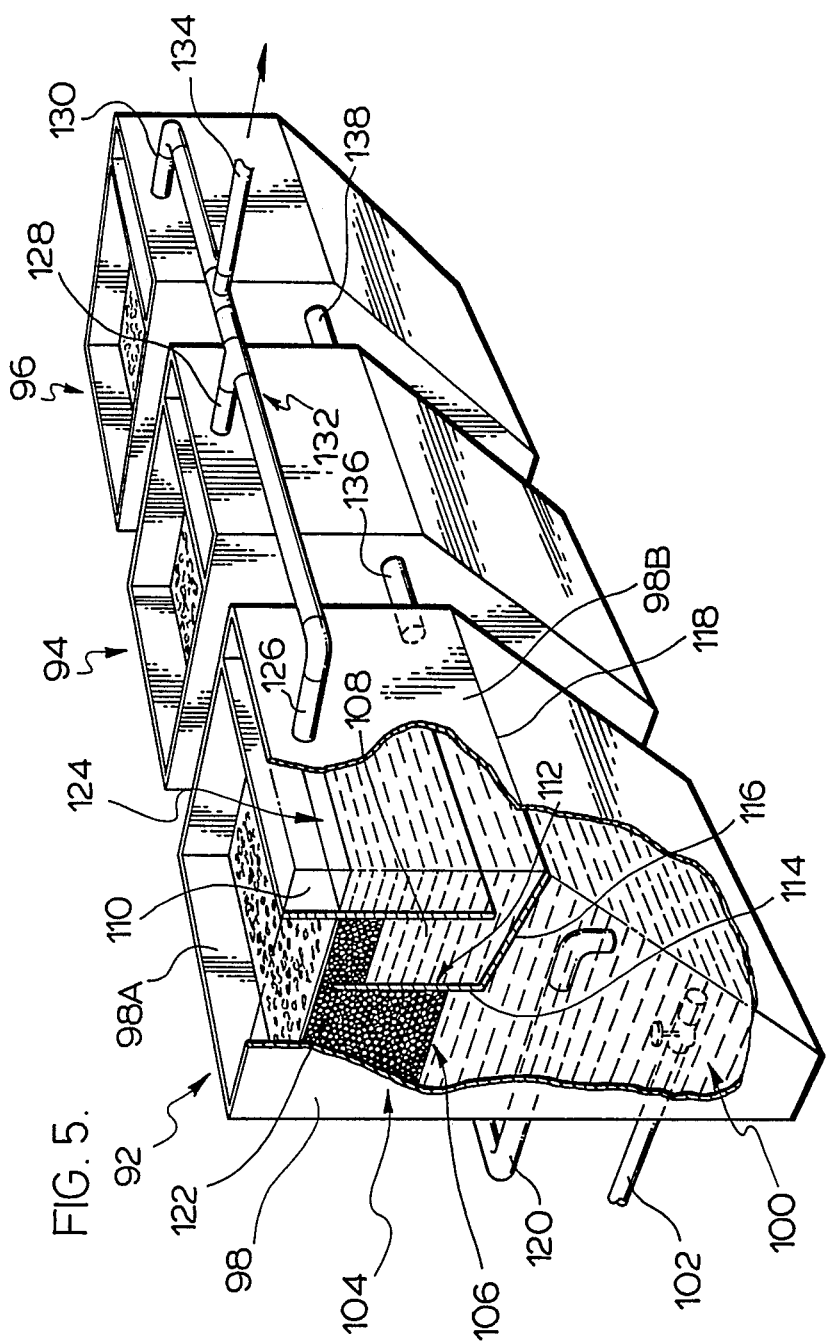

BUOYANT FILTER MEDIA

FIELD OF INVENTION

This invention relates to buoyant filter media systems and in particular a system which does not require the use of screens or the like to contain the buoyant filter media within the system.

BACKGROUND OF INVENTION

Buoyant filter media has been used for some time for purposes of removing solids from waste liquids and in particular wastewaters obtained from industrial and residential environments. Published U.K. Patent Application No. 2,080,696 discloses a filtration system using buoyant filter media. The filter media is contained in a vessel which permits the buoyant media to rise upwardly of the vessel until steady state for the height of the buoyant material in the vessel is achieved for a particular flow rate. An effluent weir is provided in the vessel at a level beneath the anticipated height of the buoyant material, to draw off the clarified liquid. The weir includes a screen to prevent the buoyant material from passing over the weir into the effluent outlet channel. The screen covering the channel can become clogged with the buoyant material, considerably reducing the effluent flow rate or causing an overflow in the upstream portion of the vessel, hence necessitating frequent checking on the system. Due to the screen being of relatively minimal cross-sectional surface area, compared to the size of the vessel, back washing is frequently required or spraying of the screens with pressurized water to cleanse them is also required. To provide cleansing of the majority of the buoyant material, air injection is required to break up the bed of buoyant material to facilitate cleansing of the bed of buoyant material.

Systems which involve the use of screens to maintain a desired level of buoyant material in the system are disclosed in U.S. Pat. Nos. 4,246,118; 4,446,027 and published European Patent Application No. 107,353. These systems trap the buoyant material in the treatment vessel, thereby necessitating frequent back wash and optionally the use of airstreams to loosen the buoyant material. Often the nozzles for injecting air in water streams during the back washing and cleansing operation become clogged or otherwise disabled due to deposits on the nozzles, which considerably reduce their effectiveness in breaking up and cleansing of the buoyant materials. In European Application No. 107,353, the screen for retaining the buoyant material in the vessel functions to hold above the screen a granular material which effectively retains the buoyant material beneath the screen, since the screen has an aperture sizing larger than the nominal size of the particles of buoyant material. By employing the larger granular material as the device for retaining the desired level of buoyant material in the vessel such as the use of gravel, the operative filtration time is extended. However, back washing or air-water flushing of the gravel is required once the gravel becomes clogged with collected solids.

According to this invention a filtration system involving the use of buoyant media is provided which requires less frequent maintenance of the filter media.

SUMMARY OF INVENTION

According to an aspect of the invention a process removes suspended solids from liquids by passing the liquids through a buoyant filter media consisting of a plurality of buoyant particles. The process comprises providing an upflow region and a downflow region as defined by a baffle arrangement in a clarifying vessel. The upflow region communicates with the downflow region across a transition region defined by a baffle partition separating the upflow region from the downflow region. The buoyant filter media is distributed in the upflow and downflow regions in a sufficient quantity to form a column of buoyant filter media in each of the upflow and downflow regions. The flow velocity of liquid is adjusted through the columns of buoyant filter media to maintain sufficient quantities of buoyant filter media in each region to effect a filtering operation. Effluent is removed from the vessel in a manner which maintains a liquid level in the transition region above an upper edge portion of the baffle partition.

According to another aspect of the invention an apparatus is provided for removing suspended solids from liquids by use of buoyant filter media consisting of a plurality of buoyant particles. The apparatus for use in a clarifier vessel comprises means for providing a baffle arrangement which defines in normal operation an upflow region in communication with a downflow region. The baffle means has an inlet for the upflow region and an outlet for the downflow region including a partition separating the upflow region from the downflow region. The partition has an upper edge portion over which the liquid flows in the transition region from the upflow region over into the downflow region. The outlet provides a liquid level in the transition region above the partition upper edge portion, the buoyant filter media is disposed in the upflow zone and the downflow zone as buoyed in liquids flowing through the upflow region, across the transition region and through the downflow region. The baffle means permits the buoyant filter media to float in an unconstrained manner in the upflow and downflow regions while liquids flow through the regions. The downflow region is of sufficient volume to accommodate the buoyant filter media carried over into the downflow region by liquids flowing through the apparatus during normal operation.

BRIEF DESCRIPTION OF DRAWINGS

Preferred embodiments of the invention are shown in the drawings wherein:

FIG. 3 is a top plan view of a continuous media wash system according to an alternate embodiment of the invention;

FIG. 4 is a section through the media wash system of FIG. 3; and

FIG. 5 is a perspective view of a parallel arrangement of three clarifiers, each having buoyant media filter system of the invention.

DETAILED DESCRIPTION OF PREFERRED EMBODIMENTS

Figure 1:
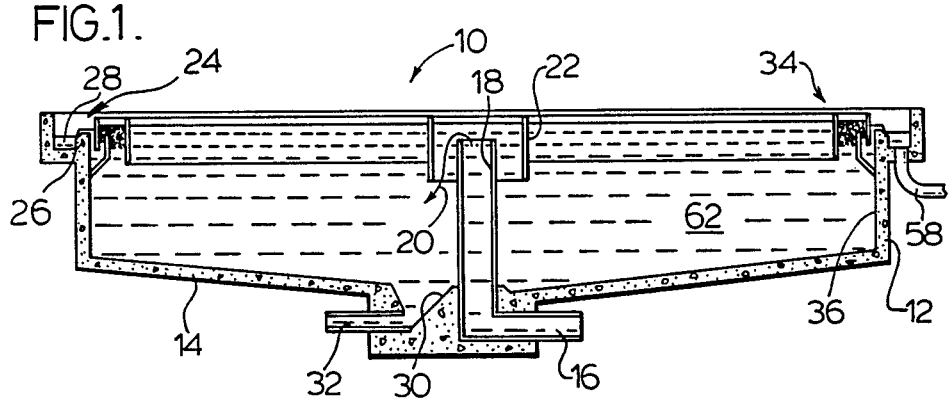
FIG. 1 is a section through a clarifier having a buoyant media filter system according to this invention.

The clarifier of FIG. 1 comprises a cylindrical vessel 10 with circular outside wall 12 and conical-shaped gradually sloping bottom wall 14. The waters to be clarified are introduced to the clarifier vessel 10 via inlet 16 in the base of the clarifier. The influent waste waters rise in tube 18 and pass downwardly in the direction of arrow 20 beneath circular baffle 22.

Figure 1A:
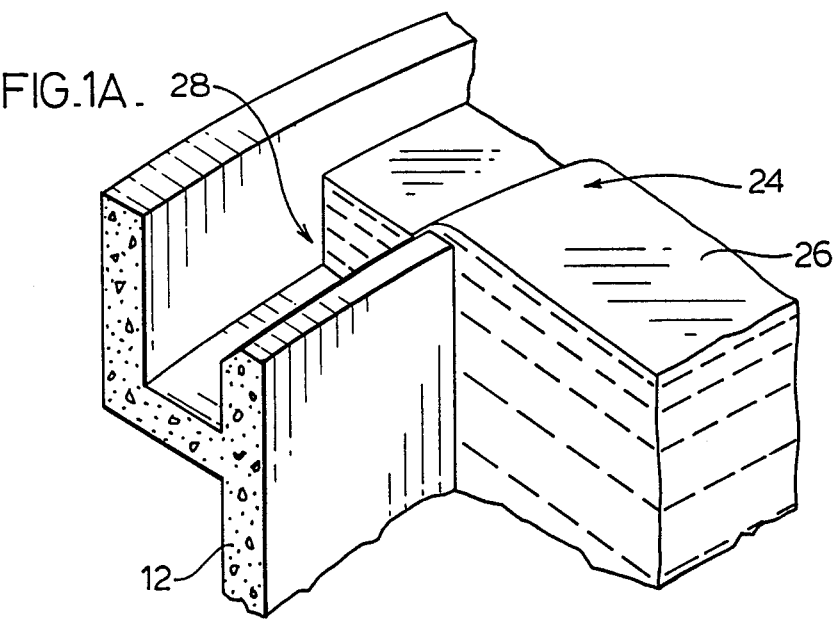
FIG. 1a is a section through a weir arrangement of a conventional clarifier.

In the normal operation of a conventional clarifier as shown in FIG. 1a, a standard type of weir 24 is shown which includes a baffle 26 over which the clarified liquids flow into channel 28 to provide for removal of the clarified liquid from the waste waters introduced to the clarifier vessel 10. During the clarifying operation of either system of FIGS. 1 or 1a precipitates collect on the bottom 14 of the vessel and gradually flow to the sludge well 30 for occasional removal via sludge withdrawal outlet 32 which is accomplished in the conventional manner.

As noted, many attempts have been made to employ the use of buoyant media filter to improve the operation of a clarifier in removing suspended solids. According to this invention, the device using buoyant media filter material may be adapted for use on conventional types of clarifiers, such as shown in FIG. 1, or any other type of clarifier such as shown in FIG. 5. With reference to FIG. 1, the device 34 for containing the buoyant media is attached to the wall 12 of the clarifier vessel and may be circular in design to be placed within the entire interior perimeter of the circular wall 12. Although not shown, appropriate suspending members and the like may be used in positioning the device 34 on the interior 36 of the cylindrical wall 12.

Figure 2:
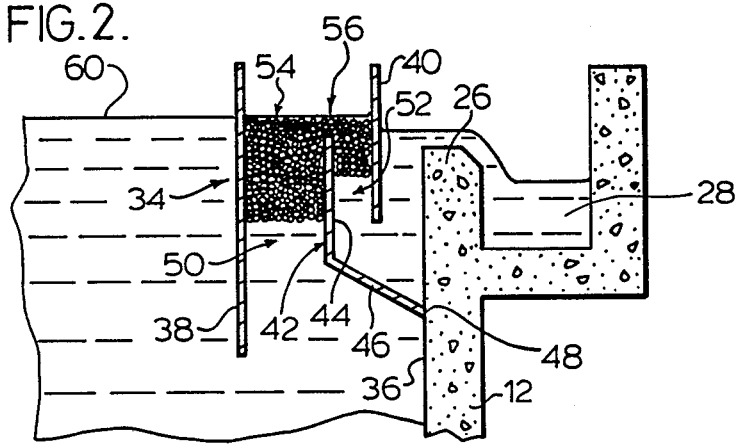
FIG. 2 is an enlarged section of the buoyant media filter system of FIG. 1.

As shown in FIG. 2, the device 34 for containing the buoyant media consists of an inner baffle 38 and an outer baffle 40 which may be arranged to form two annular rings within the perimeter of upper edge 26 of the vessel wall 12. A weir 42 comprises a vertical plate 44 integral with a diagonal plate 46 which abuts and sealingly engages the inner surface 36 of the wall 12 at location 48. Appropriate seals may be used in contacting the lower portion 48 of diagonal plate 46 to the interior surface 36 of the wall 12. This arrangement for the baffles and weir of the buoyant media device 34 provides an upflow channel, generally designated 50, and a downflow channel generally designated 52. The buoyant media generally designated 54, which is in particulate form, is introduced to the upflow region 50 of the device. As waste waters are introduced to the clarifier vessel 10, liquid flows beneath plate 38 and upwardly of region 50. Such flow of liquid buoys the media 54. Depending upon the amount of media 54 in region 50, excess is carried over into the downflow region 52 by the flow of liquid over the weir upper edge 56. Such flow of liquid defines a transition region above said upper edge 56 in transferring from the upflow channel to the downflow channel. Depending upon the flow velocities of the liquid through regions 50 and 52, a balance will be achieved of media heights in both regions. For the particular situation demonstrated in FIG. 2, less media collects in the downflow region 52 than in the upflow region 50. Providing the flow rate of influent remains the same, a steady state will be achieved of buoyant media in both regions 50 and 52. Hence liquids from which most of the suspended solids have settled out, travels through the buoyant media 54 which serves to filter out the majority of remaining fine suspended solids.

It is appreciated that a variety of buoyant media are available for use in filtration systems of the type exemplified in FIG. 1. The media is normally of a particulate type and may consist of a variety of buoyant materials, such as plastics, synthetic inorganic materials and the like. A particularly useful form of particulate material is that sold by Norton Company. The particulate material is a cellular glass nodule which is hermetically sealed to contain gases which provide a degree of buoyancy. The glass nodules may be formed of corrosion resistant, inorganic materials consisting of silicone dioxide, sodium oxide, calcium oxide, magnesium oxide, aluminum oxides, potassium oxide and a very low percentage of remaining inorganic oxides.

After the liquids pass through the buoyant media, they travel downwardly underneath baffle 40 over the upper edge 26 of the conventional weir and into the trough 28. The trough 28 leads to one or more outlets 58, such as shown in FIG. 1. Outlet 58 is controlled in a manner to prevent syphoning of liquid from the clarifier vessel 10. It is also appreciated that the liquid level 60, as shown in FIG. 2, is maintained at an acceptable level to prevent the buoyant media 54 from moving downwardly out of the upflow region 50. Hence when no liquids are introduced to the vessel, appropriate controls are implemented to ensure that the liquid level 60 is maintained sufficiently high to prevent the buoyant media passing out of the upflow region 50 into the settling region 62 of the clarifier vessel 10.

By provision of the upflow and downflow regions 50 and 52, which are in communication by way of overflow of the weir upper edge 56, a buoyant media filtration system is provided which contains the buoyant media in an unconstrained manner thereby eliminating the need for screens or the like to contain the buoyant media. Hence the buoyant media is allowed to distribute itself on its own in regions 50 and 52 without in any way restricting and forming a densely packed bed of media particles which will occur when screens or the like are used, such as in the aforementioned patents to contain the buoyant media in a defined area. With the arrangement, according to this invention, the buoyant media in being allowed to distribute itself in both regions 50 and 52, assumes an essentially non-compacted arrangement, hence a considerably reduced head loss for flows of effluent through the buoyed media. Without the use of screens, there is no need to frequently backwash the system to cleanse screens which had normally been used to contain the filter media.

By permitting the granular media to achieve a balance in levels in the two regions 50 and 52, a stratification of the various sizes of particles is achieved. The finer granular media particles locate themselves in the lower portions of the upflow region 50 to enhance the removal of the finer suspended solids. Due to the fact that the buoyed media is carried over into the downflow region 52 by the flow of effluent, the finer granular media particles also collect in the upper portion of the downflow region 52 to provide a second stage in the removal of the finer suspended solids. Due to the fact that the buoyed media is permitted to achieve its own levels in the two regions 50 and 52, it is not necessary to exactly measure the amount of media used, since in the event that there is an excess, it is distributed accordingly between the regions 50 and 52 depending upon the flow velocities of the effluent. Furthermore, due to the unconstrained provision for containing the buoyed media in the device 34, the height of buoyed media in upflow region 50 provides a qualitative indication of the amount of media present. In knowing the buoyancy characteristics of the particulate media, for a given height of media above the liquid level in the upflow region 50, an estimate of the amount of the media which is immersed in the liquid can be made.

From time to time it is necessary to cleanse the buoyed media of the particulate solids removed from the effluent. The media can be rejuvenated by back washing of the system which can be accomplished by reversing the flow of liquid through the device 34. Clarified liquid may be used to back wash the media by passing back wash liquid upwardly through region 52 and downwardly through region 50. Normally this moves the buoyed media from region 52 entirely back into region 50. The flow velocities of the back wash liquid is selected to prevent pushing of the media down into the main region of the clarifier. In a system of the size of FIG. 1, it is preferable to provide a type of media rejuvenation which prevents shutdown of the clarifier. This can be accomplished by the continuous media cleaning system as shown in FIGS. 3 and 4.

Baffle 38 is continuous about the interior of the clarifier vessel 10, whereas baffle 40 and weir 42 are interrupted by partitions 64 and 66. In the region 68 between the partitions 64 and 66, a media rinsing apparatus generally designated 70 is provided. The section through the apparatus 70 is shown in FIG. 4, where an airlift or similar type of pump 72 is used to withdraw the buoyed media from region 52 and pass it upwardly through line 74 into a U-shaped trough 76. The trough 76 has an opening 78 which directs the particulate media onto a screen 80 which is concave and extends down to a particulate media collecting trough 82. The openings in the screen 80 are such to prevent the particles of the media falling through the screen. A spray nozzle 84 is provided to direct a spray of cleansing solution 86 onto the particulate matter as it rolls down the screen 80, hence washing off the the surface material of suspended solids collected from the effluent. The wash water, as it passes through the screen 80, is collected in funnel portion 88 and removed via line 90. The wash liquid may be returned to the clarifier 62 or otherwise disposed of. The collected washed particulate matter in trough 82 is then returned by gravity into the upflow region 50 of the clarifier. In this manner by removing buoyed media from region 52 and replacing it to region 50, a continuous cleansing or washing of the particulate media is provided without the need of stopping the operation of the clarifier vessel 10.

It is appreciated that the device for containing the buoyed media may be used in a variety of clarifier systems. An alternative type of clarifier system is shown in FIG. 5 where three separate clarifier tanks, generally designated 92, 94 and 96, are provided. Each tank has a rectangular-shaped side wall portion 98 with a tapered lower part 100 for collection of precipitated suspended matter which may be withdrawn through sludge withdrawal outlet 102. The buoyant media containment device generally designated 104 consists of an upflow region 106 and an downflow region 108. These regions are defined by a baffle 110 and a section of the vessel wall 98a. A weir 112 is provided which has a vertical partition 114 and a diagonal partition portion 116 which is sealed to wall 98b along the junction 118. The waste waters to be clarified are introduced to each vessel via influent line 120. The liquid flows upwardly through region 106 over the weir upper edge 122 and down through region 108. The liquid, as clarified, passes beneath baffle 110 and upwardly into effluent channel 124 for removal by the effluent conduits 126, 128 and 130. The effluent conduits lead into a manifold 132 with a single outlet 134.

The clarifier vessels 92, 94 and 96 may be operated in parallel such that one of the vessels may be back washed, while the other two vessels continue to operate in clarifying the influent. Liquid from the clarified region 124 may be transferred to the corresponding region of an adjacent vessel by way of the interconnecting pipes 136 and 138. The influent is withdrawn from the vessel to allow the liquid passing through either of pipes 136 or 138 to an adjacent vessel to flow in a reverse order through regions 108 and 106 to provide a back washing of the respective particulate media. In back washing the media, normally the particulate media moves from region 108 back into region 106. Flows of the back washing liquid are continued until it is determined that suspended solids adhered to the particulate matter is sufficiently removed to rejuvenate adequately the media for reuse. At this point, flow is reversed and influent is reintroduced to the respective vessel and clarified liquid removed from the respective outlet. Hence the parallel system may be operated such that at any time, two of the vessels are used to filter incoming waste waters while the remaining vessel is being back washed.

In either systems of FIGS. 1 or 5, the back washing of the media in causing it to flow from one region to the other, breaks up any coagulated lumps of the particulate media to optimize on the efficiency of the particulate media in removing suspended particulate matter during normal operation.

It is appreciated that the buoyed media filter systems may be used in a variety of existing systems for removing suspended solids from liquids, or also for recovery of products from reaction media. The filtration system may be used for the removal of waste solids from waste waters or water supplies. The system may also be used as a primary filter system or to improve the performance of existing clarifiers. Furthermore, the system may be used for the removal of biological solids in a fermentation process. The system also provides for a minimum of operator attention during use and due to its mechanical simplicity, requires minimal maintenance.

Although preferred embodiments of the invention have been described herein in detail, it will be understood by those skilled in the art that variations may be made thereto without departing from the spirit of the invention or the scope of the appended claims.

We claim:

1. Apparatus for removing suspended solids from liquids by use of buoyant filter media consisting of a plurality of buoyant particles, said apparatus for use in a clarifier vessel comprising means for providing a baffle arrangement which defines in normal operation an upflow channel in communication with a downflow channel, said baffle means having an inlet for said upflow channel and an outlet for said downflow channel including a partition separating said upflow channel from said downflow channel, said partition having an upper edge portion over which said liquid flows in a transition region from said upflow channel over into said downflow region, said buoyant filter media being disposed in said upflow channel and said downflow channle as buoyed in liquids flowing through said upflow channel, across said transition region and through said downflow channel, said baffle means permitting said buoyant filter media to float in an unconstrained manner in said upflow and downflow channels while liquids flow through said regions; said downflow channel being of sufficient volume to accommodate said buoyant filter media carried over into said downflow channel by liquids flowing through said apparatus during normal operation, wherein said outlet for said downflow channel is a second upflow region in communication with a lowermost portion of said downflow region, said second upflow region having a discharge for effluent at a level which establishes a liquid level in said transition region above said partition upper edge portion.

2. An apparatus of claim 1 wherein said baffle means comprises a first wall spaced from one side of said partition and which extends above said partition upper edge portion, said upflow channel being defined between said first wall and said partition where said inlet is defined between lower portions of said first wall and said partition, a second wall being spaced from another side of said partition and which also extends above said partition upper edge portion, said downflow channel being defined between said second wall and said partition, said buoyed filter media being contained above said partition upper edge portion by said first and second walls.

3. An apparatus of claim 2 wherein a third wall is spaced from said second wall, said partition extends beneath a bottom portion of said second wall across to said third wall, said partition as it extends beneath said second wall is spaced therefrom to permit liquids to flow out of said downflow channel and upwardly between said second and third walls, said third wall having an effluent outlet at a level which maintains said liquid level above said partition upper edge.

4. An apparatus of claim 3 wherein said first, second and third walls and said partition are circular in shape to define annular shaped upflow and downflow channels.

5. Apparatus of claims 2 or 3 wherein means for continuously washing said buoyant filter media is provided, said washing means comprising means for withdrawing said buoyant filter media from said downflow channel, means for passing said withdrawn buoyant filter media through means for washing said solids from said buoyant filter media and means for returning said washed buoyant filter media to said upflow channel.

6. Apparatus of claim 1 wherein means is provided for reversing a flow of a backwashing liquid through said apparatus, said reversing means directing a backwashing liquid through said outlet for discharge from said apparatus via said inlet, such backwashing liquid passing in a reverse direction through said downflow channels and said upflow channel to backwash thereby buoyant filter media in said channels.

7. A process for removing suspended solids from liquids by passing said liquids through a buoyant filter media consisting of a plurality of buoyant particles, said process comprising providing an upflow channel and a downflow channel as defined by a baffle arrangement in a clarifying vessel, said upflow channel communicating with said downflow channel across a transition region defined by a partition of said baffle arrangement separating said upflow channel from said downflow channel, distributing said buoyant filter media in said upflow and downflow channels in an unconstrained manner with a sufficient quantity to form a column of buoyant filter media in each of said upflow and downflow channels, adjusting flow velocity of liquid through said columns of buoyant filter media to maintain sufficient quantities of buoyant filter media in each channel to effect a filtering operation, and removing effluent from said vessel in a manner which maintains a liquid level in said transition region above an upper edge portion of said partition.

8. A process of claim 7 wherein said quantities of buoyant filter media in each column for the upflow and downflow channels vary depending upon flow velocity of liquid through said upflow channel.

9. A process of claim 7 further comprising backwashing said buoyant filter media to remove solids collected on the surfaces of the filter media, a flow of backwashing liquid is circulated in a reverse direction upwardly through said downflow channel and downwardly of said upflow channel, controlling flow velocity of said backwash liquid to maintain buoyant filter media in said upflow channel while causing buoyant filter media to move upwardly of said downflow channel, through said transition region and downwardly of said upflow channel, said buoyant filter media as it moves through said transition region breaking up any coagulated lumps of filter media.

10. A process of claim 7 wherein said buoyant filter media particles consist of cellular glass nodules which are hermetically sealed to contain gases which provide a degree of buoyancy.

11. A process of claim 10 wherein said particles are of varying sizes, said flow velocity of liquid is controlled to achieve an equilibrium distribution of said buoyant filter media particles in said upflow and downflow channels, said flow velocity of liquid developing a stratification of said filter media according to particle size in upflow and downflow channels to provide for multistage filtration in said upflow and downflow channels.

12. A process of claim 7 further comprising withdrawing continuously a portion of said buoyant filter media from said downflow region, washing said withdrawn media to remove collected solids from surfaces of said media particles, returning said washed media particles to said upflow channel.

13. A process of claim 7 wherein effluent from said downflow channel is circulated upwardly before discharge through an effluent outlet which is at a level to maintain said liquid level in said transition region above said partition.

* * * * *